United States Patent
Coste

(10) Patent No.: US 7,757,476 B2
(45) Date of Patent: Jul. 20, 2010

(54) CATALYTICALLY ACTIVATED TRANSIENT DECOMPOSITION PROPULSION SYSTEM

(75) Inventor: Keith Coste, West Hills, CA (US)

(73) Assignee: The Aerospace Corporation, El Segundo, CA (US)

( * ) Notice: Subject to any disclaimer, the term of this patent is extended or adjusted under 35 U.S.C. 154(b) by 2096 days.

(21) Appl. No.: 10/624,754

(22) Filed: Jul. 22, 2003

(65) Prior Publication Data
US 2009/0120060 A1    May 14, 2009

(51) Int. Cl.
*F02K 9/44* (2006.01)
*F02K 9/68* (2006.01)

(52) U.S. Cl. ...................... 60/257; 60/39.462

(58) Field of Classification Search ............ 60/208, 60/257, 258, 260, 39.462
See application file for complete search history.

(56) References Cited

U.S. PATENT DOCUMENTS

| | | | | |
|---|---|---|---|---|
| 3,544,061 A | * | 12/1970 | Moy et al. | ............ 60/258 |
| 3,603,093 A | * | 9/1971 | Isley et al. | ............ 60/260 |
| 3,871,828 A | * | 3/1975 | Ellion et al. | ............ 60/258 |
| 4,069,664 A | * | 1/1978 | Ellion et al. | ............ 60/258 |
| 4,162,292 A | * | 7/1979 | Speeds et al. | ............ 60/39.462 |
| 4,324,096 A | * | 4/1982 | Ellion | ............ 60/218 |
| 4,490,972 A | * | 1/1985 | Ellion et al. | ............ 60/39.462 |
| 4,635,885 A | * | 1/1987 | Hujsak | ............ 60/39.462 |
| 5,117,627 A | * | 6/1992 | Runavot | ............ 60/218 |
| 6,931,832 B2 | * | 8/2005 | Berg et al. | ............ 60/260 |

* cited by examiner

*Primary Examiner*—Ted Kim
(74) *Attorney, Agent, or Firm*—K&L Gates LLP

(57) ABSTRACT

A catalytically activated transient decomposition propulsion system provides thrust by decomposing flow controlled propellant in contact with a catalyzing agent using a fixed volume of liquid propellant that is placed in contact with the catalyst within the decomposition chamber by a calibrated flow control valve. After injecting the liquid propellant into the decomposition chamber, the valve returns to the closed position while surface tension holds the liquid within the decomposition chamber until complete decomposition and exhaust of the warm gaseous products through a converging and diverging nozzle occurs. The increasing and decreasing transient pressure in the decomposition chamber changes each cycle in response to flow control valve actuation as the decomposition process is repeated.

17 Claims, 2 Drawing Sheets

CATALYTIC TRANSIENT DECOMPOSITION PROPULSION SYSTEM

CATALYTIC TRANSIENT DECOMPOSITION PROPULSION SYSTEM

PROPULSION SYSTEM CONTROL DIAGRAM

CATALYTICALLY ACTIVATED TRANSIENT DECOMPOSITION PROPULSION SYSTEM

FIELD OF THE INVENTION

The invention relates to the field of propulsion systems. More particularly, the invention relates to catalytically activated decomposition propulsion systems.

BACKGROUND OF THE INVENTION

Rocket engines can be divided into four main categories consisting of ignition combustion engines, catalytic decomposition engines, pulsed detonation engines, and solid propellant engines. Ignition combustion engines are controlled by opening liquid propellant control valves and allowing propellants to flow into a combustion chamber. The combustion is either self-initiated due to a hypergolic reaction between propellants or by another ignition source, such as a spark plug. After combustion has begun, thrust is produced until the propellant control valves are closed and flow of propellant into the combustion chamber has stopped. The thrust level produced by combustion is directly related to the flow rate of propellants into the combustion chamber and therefore the pressure in the propellant tanks that is driving the propellant flow while the propellant control valves are open. The thrust produced is proportional to the feed pressure in the propellant tank and the flow rate into the combustion chamber. The propellant flow stops when the control valves are closed and thrust is then stopped. Operations with rocket combustion require rapid ignition and high combustion temperature. If ignition delay is too slow, unburned propellant will be exhausted from the rocket engine, reducing performance and potentially causing damage to the vehicle. If combustion temperature is too high, materials within the combustion chamber will be degraded resulting in catastrophic failure of the engine.

A catalytic decomposition engine uses a monopropellant that flows into a decomposition chamber and produces thrust as long as the control valve is open and the monopropellant is flowing into the decomposition chamber. Referring to FIG. 2, a bipropellant ignition combustion engine and the monopropellant catalytic decomposition engine function as rocket propulsion systems where thrust is developed during control valve actuation when the propellant is flowing into the combustion chamber and thrust is terminated when the control valve is closed, in an on and off cyclic operation.

Pulse detonation engines rely a fixed quantity of two propellants, including fuel and an oxidizer, that are fed into the combustion chamber in pulses by concurrently opening two propellant control valves and then concurrently closing the two propellant control valves. When the control valves are closed, the flow of propellant into the chamber is stopped and the chamber contains the desired quantity of propellant. Combustion is had by either self-initiation by a hypergolic reaction or by another ignition source. Upon ignition with the control valve closed, the fuel and the oxidizer propellants combust, resulting in a supersonic detonation wave expanding from the combustion chamber and exiting the engine through a diverging exhaust nozzle. Once the detonation wave has exited the combustion chamber through the exhaust nozzle, the control flow, ignition, and combustion processes are repeated. An integral feature of pulsed detonation engines is a large pressure spike in the combustion chamber when detonation occurs. This pressure spike creates design problems due to structural concerns with the combustion chamber and the transmission of the shock to the rest of the vehicle. Current pulse detonation engines do not use catalytic decomposition due to the requirement for rapid ignition to generate a detonation. If a detonation could be generated by a catalyzed reaction, the force of the shock could damage the catalyst bed. As shown in FIG. 2, the pulse detonation wave occurs just after closing the control valve.

Solid propellant engines use solid propellants to create thrust in a continuous mode without the use of fuel control valves. Throat exhaust valves in converging and diverging exhaust nozzles have been particularly used in the solid propellant engines, often referred to as rocket motors, where the throat valve is used to throttle the rocket motor, that is, to raise and lower the exhaust flow for controlling the thrust on demand, because the solid propellant engine cannot otherwise be controlled. Thrust is controlled because the valve reduces the throat area and restricts the exhaust flow. A solid propellant engine cannot completely close the throat exhaust valve because the combustion will either be completely extinguished and not reignited, or will accelerate resulting in a combustion chamber overpressure and rupture. Liquid propellant engines, including the ignition combustion engines and the catalytic decomposition engines, do not use throat exhaust valves because thrust can controlled more easily through the use of the liquid propellant-flow control valve.

Gas generator propulsion systems use throat exhaust valves. In a monopropellant gas generator propulsion system, liquid propellant flows into a catalyst bed and decomposes into a warm gas and exhausts into a warm gas storage tank. The warm gas can then be stored and exhausted when thrust is needed by flowing the warm gas through a manifold to any number of gas thrusters. The gas thrusters are a valve with a throat and a nozzle located at the exit of the valve. The valve acts as a throat exhaust valve because the valve controls the flow of decomposed propellant through the throat and out the exhaust nozzle. The warm gas storage tank is used to hold the decomposed gas for later time released usage, in hours, days, months, or even years.

Pressurized gas propulsion systems have been used on existing picosatellites. Recently, picosatellite sized vehicles have been proposed for numerous space missions. However, total available $\Delta V$ from the propulsion system has limited the orbits available to these vehicles. With insufficient $\Delta V$, the vehicles would be unable to perform sufficient deorbit maneuvers and could eventually create a hazard for other space vehicles. The pressurized gas propulsion system is safe to use and requires only a simple exhaust system, but has low performance capability. Pressurized gas systems can be designed to store the gas propellant as a high-pressure compressed gas or as a saturated liquid. Both storage methods have advantages and disadvantages. The primary trade exists between the relatively high specific impulse (Isp) efficiency provided by compressed gas versus the high storage density obtained by saturated liquids. Two examples are discussed. A 5.0 in$^3$ volume of Nitrogen at 800 psia operating at Isp=65 will result in a total impulse of 0.746 lb$_f$*sec=3.32 Ns. With an equal volume, Butane as a saturated liquid will have a pressure of 31 psia, and with an operating Isp=40, a total impulse of 4.2 lb$_f$*sec=18.6 Ns will result. The large increase in delivered impulse results from the significant density improvement with a saturated liquid despite having a lower specific impulse. Further large gains in delivered impulse could be achieved with a liquid monopropellant by maintaining the high density but simultaneously achieving a high specific impulse. Four cubic inches of hydrazine with 1 in$^3$ gas volume for pressurization and with a specific impulse of 200 lb$_f$*sec/lb$_m$ a total impulse of 29 lb$_f$*sec=129 Ns will result. Despite this performance advantage, hydrazine has not been used for several reasons. The primary concern is with hydrazine toxicity that creates severe handling and test restrictions that can add significant cost to the overall system. These same handling concerns create safety issues when integrating the picosatellite with the primary payload on the launch vehicle. In a typical hydrazine satellite thruster, propellant is introduced into the combustion chamber by opening a solenoid valve and allowing liquid flow until thrust is terminated by closing the valve. Ignition delay times are less then 5.0 ms and time to 90% thrust is typically less then 50.0 ms. With this rapid ignition and pressurization of the chamber, combustion occurs mainly as a steady process even with very short pulse durations. This provides accurate control and handling for sensitive satellite systems.

In contrast to hydrazine, hydroxyl ammonium nitrate (HAN) is generally considered to be a non-toxic, that is, a green propellant. HAN usage minimizes the handling concerns raised by hydrazine. In addition to low toxicity, HAN is a stable liquid thereby further improving the handling characteristics. In many respects, HAN could be considered safer than butane and compressed gas due to the lower flammability of HAN in air and the reduced pressure for storage of HAN. The largest drawback of HAN usage is the difficulty rocket engines have had in achieving reliable, repeatable combustion ignition at reasonable preheat temperatures with catalysts that do not melt. HAN ignition delay is too long for current conventional rockets and the HAN decomposition temperature is too high for current conventional catalysts. Monopropellant catalytic decomposition engines for satellite propulsion systems using HAN cannot achieve short ignition delay times because the initial decomposition rate of liquid HAN is slow. HAN is unsuitable for monopropellant catalytic decomposition engines because slowly decomposing HAN cannot decompose fast enough for sufficient engine efficiency and rapidly decomposing HAN results in excessively high temperatures, for example, greater than 2000° F., that are known to damage catalyst materials. As such, HAN is not suitable for decomposition propulsion systems. Two difficulties in designing a HAN based propulsion system are achieving the desired ignition characteristics and maintaining acceptable hardware temperatures during operation. These and other disadvantages are solved or reduced using the invention.

SUMMARY OF THE INVENTION

An object of the invention is to provide a catalytic decomposition propulsion system using an opening and closing control valve.

An object of the invention is to provide a catalytic decomposition propulsion system using an opening and closing intake control valve where decomposition in a decomposition chamber increases after opening the intake control valve and where decomposition in the decomposition chamber continues to completion after closing the intake control valve.

Another object of the invention is to provide a catalytic decomposition propulsion system using an opening and closing control valve for feeding a slow decomposing propellant into a decomposition chamber in pulses.

Yet another object of the invention is to provide a catalytic decomposition propulsion system using an opening and closing control valve for feeding a decomposing propellant into a decomposition chamber having a plurality of beds with respectively sized bedding for supporting respectively sized catalytic particles for improved thrusting performance.

Still another object of the invention is to provide a catalytic decomposition propulsion system using an opening and closing control valve for feeding a decomposing propellant into a decomposition chamber attached to a converging and diverging exhaust nozzle.

A further object of the invention is to provide a catalytic decomposition propulsion system using an opening and closing control valve for feeding a decomposing propellant into a decomposition chamber attached to a recirculation tube for feeding back pressurized gas into an injector manifold for improved performance.

The invention is directed to a catalytically activated transient decomposition propulsion system that provides thrust by decomposing a monopropellant in contact with a catalyzing agent. The transient decomposition indicates that a majority of the monopropellant decomposition occurs after the intake control valve has closed in a catalytically activated decomposition propulsion system. The decomposition chamber pressure is transient in that, the chamber pressure rises when decomposition begins and the chamber pressure falls when all of the propellant is decomposed but never reaches a steady operating level. A fixed volume of liquid propellant is placed in contact with the catalyst within the decomposition chamber by a calibrated flow control valve for pulsing amounts of the monopropellant into the decomposition chamber. After injecting the liquid monopropellant into the decomposition chamber, the valve returns to the closed position. Surface tension holds the liquid monopropellant within the decomposition chamber until complete decomposition and exhaust of the warm gaseous products exhausted through a converging and diverging nozzle occurs. Thrust is produced by exhaust of the decomposed monopropellant, which had been slowly catalyzed after the liquid control valve was closed. Following the return to ambient pressure within the decomposition chamber, the valve control, propellant decomposition, and gaseous exhaust processes are repeated. In a preferred form, a throat valve and a recirculating tube are integral to the system for improved performance and control. The throat valve is used for improving the decomposition process leading to immediate usage of the decomposed gas within seconds. The recirculating tube provides for pressurized injection of the exhaust gas through the injector manifold to eliminate residue of unused liquid propellant. In the preferred form, the decomposition chamber is divided into a plurality of beds for supporting respective sized catalytic particles for providing a gradient of sized catalytic particles from the largest at the injector to the smallest at the converging nozzle for improved performance.

The improved density performance of the propulsion system increases the total ΔV available for the same sized system and therefore will allow a greater range of usable orbits. By allowing more orbital freedom, the propulsion system enables a wider range of useful payloads for picosatellite sized space vehicles. The propulsion system can provide sufficient thrust for small picospacecraft with the advantage of utilizing highly energetic but stable propellants such as hydroxyl ammonium nitrate (HAN). HAN is usable due to the slow decomposition process, which is insensitive to HAN's long ignition delay time and allows for greater heat transfer, mitigating HAN's high decomposition temperature. The propulsion system preferably uses HAN as a monopropellant to provide high total impulse in a safe manner. The use of HAN propellant allows simplified handling, storage, and test procedures due to the stability and nontoxicity of HAN for suitable use on picosatellites providing a successful, safe, and easily handled propulsion system capable of providing approximately five times greater total impulse. These and other advantages will become more apparent from the following detailed description of the preferred embodiment.

DETAILED DESCRIPTION OF THE PREFERRED EMBODIMENT

Figure 1:
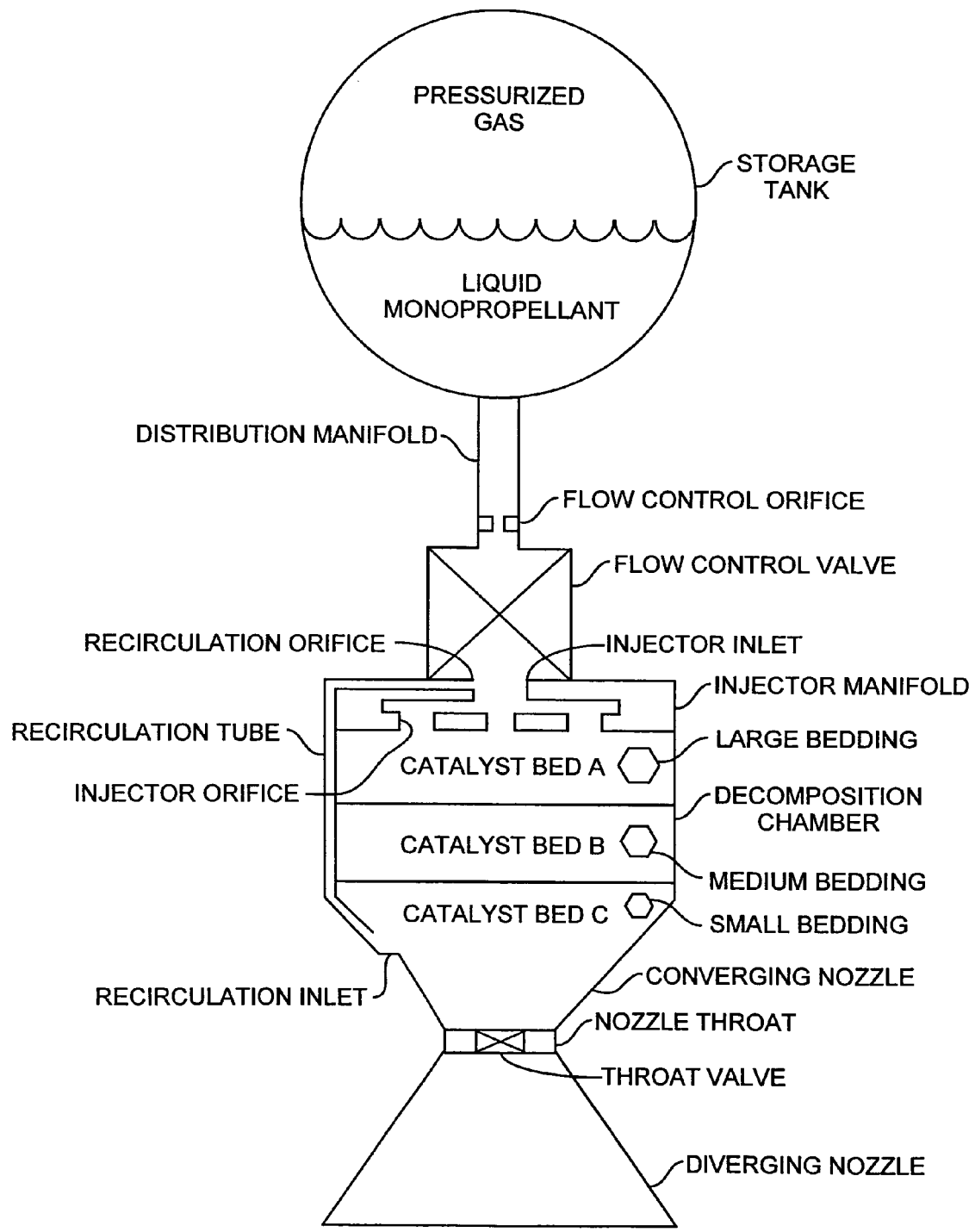
FIG. 1 is a mechanical drawing of a catalytic transient decomposition propulsion system.

An embodiment of the invention is described with reference to the figures using reference designations as shown in the figures. Referring to FIG. 1, a catalytic transient decomposition propulsion system includes a storage tank, pressurized gas and monopropellant that flows from the tank into a distribution manifold having a flow control orifice that restricts the flow to a maximum flow rate. The storage tank is a monopropellant holding tank that is pressurized by a compressing gas as the pressurized gas. The tank can be a low weight tank because a low pressure is sufficient to provide a low velocity liquid monopropellant injection. The pressurized gas can be nitrogen-compressed gas. The propellant is transported under pressure from the storage tank, through the distribution manifold and flow control orifice and through a flow control valve that controls the flow of the monopropellant through an injector inlet and into an injector manifold. The propellant flow control valve operates as a common solenoid valve designed to provide a fixed and repeatable quantity of propellant delivered into a decomposition chamber every time the valve is commanded open and closed. The liquid monopropellant enters a decomposition chamber at low velocity and is held in place in the decomposition chamber by surface tension. The flow control valve is a fast acting solenoid valve operating as a droplet dispenser. Size reduction of the propulsion system can be accomplished by integrating the propellant storage tank with miniaturized propellant flow control valves.

Propellant flows from the pressurized propellant tank and through the flow control valve and into the decomposition chamber while the valve is open due to the differential pressure, which exists between the pressure in the pressurized tank and the pressure in the decomposition chamber. The flowing propellant is delivered to the decomposition chamber under valve control and through the injector manifold having a plurality of injector orifices and into the decomposition chamber, preferably evenly distributed across the catalyst. The injector manifold distributes the monopropellant in a desired patterned spray into the decomposition chamber. Once the monopropellant flow control valve closes, the liquid monopropellant is held within the decomposition chamber by surface tension of a catalyst bed having bedding supporting particulate of a catalyst that reacts with the monopropellant. The catalyst bed forms a long path through which the propellant must travel to reach the exhaust nozzle. The monopropellant is held in contact with the catalyst for sufficient time to fully decompose the monopropellant preferably having a long ignition delay time. The catalytic transient decomposition propulsion system creates thrust by catalytically decomposing a fixed quantity of flow-controlled monopropellant when in contact with a catalyst.

The liquid monopropellant in the decomposition chamber will be slowly exothermally decomposed into a warm exhaust gas when in contact with the catalyst and will then be exhausted through a conventional converging and diverging nozzle thereby providing thrust. Gaseous propellant products are exhausted from the decomposition chamber through a conventional nozzle. The catalytically activated transient decomposition propulsion system provides thrust by using surface tension to maintain contact between liquid monopropellant and a solid catalyst and by providing a long path through the catalyst for the propellant to travel prior to exiting through the exhaust nozzle. By holding the liquid monopropellant in contact with the catalyst for sufficient duration, a preferred slow catalytic reaction occurs inside the decomposition chamber serving as a quasi-combustion chamber. The slow decomposition process allows for the use of stable, slow reacting, non-toxic monopropellants such as hydroxyl ammonium nitrate (HAN).

The slow decomposition process will also provide reduced shock thrust. The reduced shock thrust provides advantages in vehicle design and control. The controlled cyclical rate of the catalytically activated transient decomposition propulsion system process allows highly exothermic monopropellants to be used while maintaining a reduced catalyst bed temperature and low monopropellant velocity. The reduced temperature and low speed of the monopropellant inside the decomposition chamber result in low-erosion and reduced engine wear. The slow catalytic reaction and the cyclical nature of the decomposition both provide thrust that can be controlled by exhaust nozzle throat valve located in the nozzle throat of the converging and diverging nozzle. The transient decomposition propulsion system preferably includes a throat valve that is a fast acting valve located at the nozzle throat for controlled thrusting. The benefit of the throat valve is that the throat valve would delay the exhaust of the propellant from the decomposition chamber. This delayed exhaust would give the liquid propellant more residence time in the decomposition chamber and therefore promote a higher total percentage of decomposition of liquid monopropellant to hot gas. The more of the liquid that decomposes, the more efficiently the propulsion system will operate.

Monopropellant flow enters the flow control valve after passing through a flow control orifice. The flow control orifice restricts the rate of liquid flow when the valve is opened. Propellant exits the flow control valve and enters the injector manifold. The injector manifold is designed such that the propellant enters the decomposition chamber having a catalyst bed in a manner that allows surface tension to minimize liquid loss through the nozzle to the outside environment. This minimization of monopropellant loss is achieved by minimizing the injection flow velocity with the use of a small number of large diameter injector flow passages, as shown. The injector flow passage cross-section shape is optimized to minimize surface tension in order to minimize liquid propellant trapped in the injector flow passages. One method of minimizing liquid trapped in the injector is to incorporate a small diameter warm gas return recirculation tube that prevents liquid flow, but allows warm decomposition gas to flow back into the injector manifold through a recirculation orifice in order to move trapped liquid from the injector manifold into the catalyst bed.

The design of the decomposition chamber uses a gradient catalyst bed to maximize surface tension between the catalyst and the liquid monopropellant near the injector manifold for a slow rate of decomposition while providing a fast rate of decomposition closer to the nozzle throat. This is preferably accomplished using a plurality of graduated catalyst bedding. In the preferred form, the decomposition chamber is divided into three exemplar catalyst beds, such as catalyst bed A having large sized bedding, catalyst bed B having medium sized bedding, and catalyst bed C having small sized bedding. The large size bedding support large size catalytic particles. The medium size bedding support medium size catalytic particles. The small size bedding support small catalytic particles. Hence, the decomposition chamber is a graduated decomposition. That is, the catalyst bed is broken up into three beds supporting with respective sized catalyst particles. The physical design of each bed incorporates wider opening gaps between catalyst bedding closer to the injector and smaller opening gaps between catalyst bedding closer to the nozzle throat. The wider gaps will reduce the surface area of contact between monopropellant and catalyst, which will therefore slow the rate of decomposition closer to the injector. Decomposing liquid closer to the nozzle throat will reduce the amount of liquid monopropellant lost due to the flow of decomposed warm gas through the decomposition chamber. As decomposition proceeds and warm gas is generated, pressure will rise in the decomposition chamber and gas will exit the nozzle, thereby producing thrust.

Figure 2:
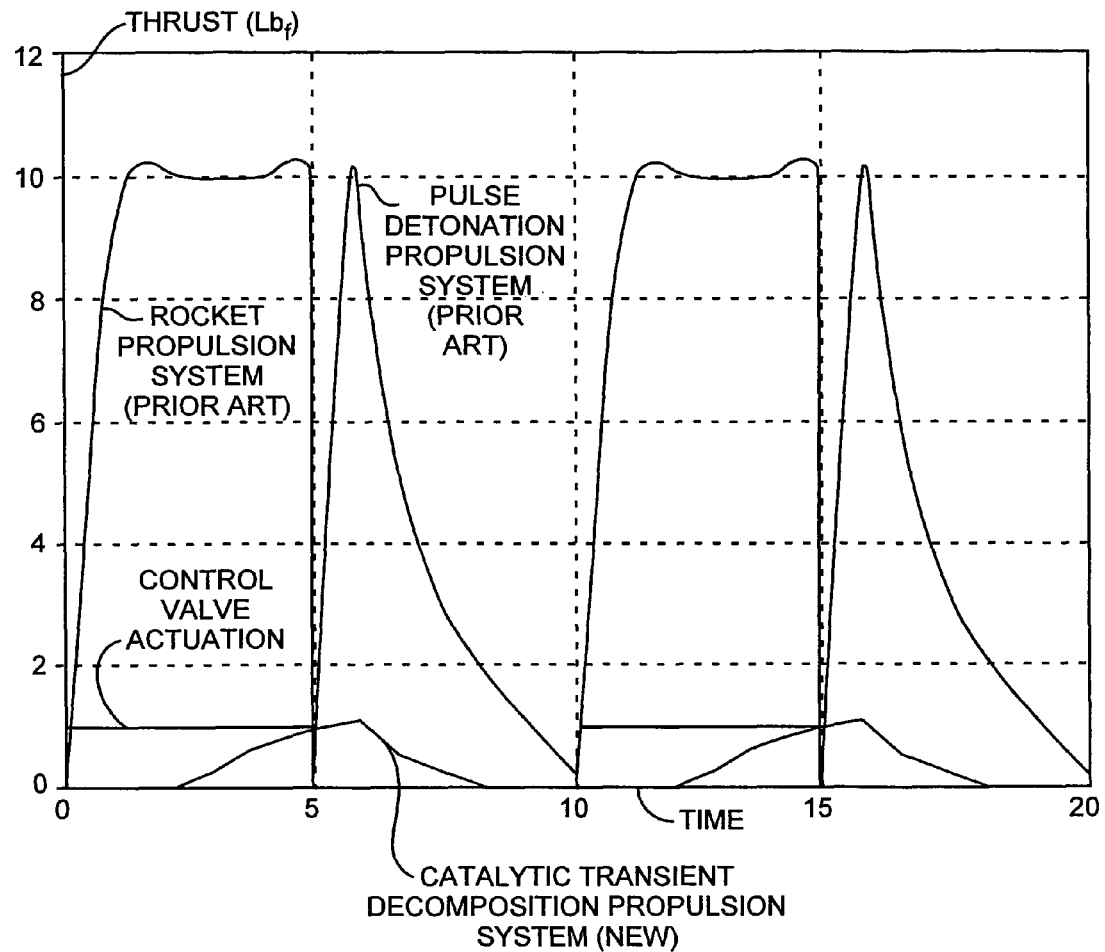
FIG. 2 is a propulsion system control-timing diagram.

Referring to FIGS. 1 and 2, and more particularly to FIG. 2, the flow control valve operates to provide a repeatable quantity of monopropellant each open and close cycle. Preferably, the cycle rate is a constant rate. The catalytic transient decomposition propulsion system will operate in a transient mode. When the flow control valve is actuated to the open state and then back to the closed state, a fixed quantity of liquid monopropellant is introduced into the decomposition chamber. Inside the combustion chamber, the droplets of the monopropellant are held in contact with the catalyst by surface tension. At the area of contact, the propellant will begin to slowly decompose and release heat. The heat release will accelerate the decomposition rate until all of the propellant has been decomposed. The resulting hot-gas products will be exhausted from the decomposition chamber as the hot-gas products are produced. Using timing or pressure sensor logic of a propulsion control system, not shown, the propulsion system will then insert another fixed volume of the propellant into the combustion chamber. This process will continue, producing pulsed mode impulses. When the flow control valve is opened, the propellant enters the decomposition chamber, adheres to the catalyst and begins slow decomposition. After the flow control valve is closed, decomposition of the monopropellant in the decomposition chamber continues to increase. As the monopropellant is decomposed, hot gas will be formed and will exit the decomposition chamber through the converging, diverging exhaust nozzle. When a majority of the liquid monopropellant has decomposed to hot gas, decomposition will decrease and the chamber pressure will decrease until all of the liquid monopropellant has been decomposed. The flow control valve is then opened again at the beginning of the next flow control valve cycle. In this manner, the thrust is produced in a pulsed manner, with transits between high and low decomposition rates in skewed synchronism with the actuation of the flow control valve. The system preferably uses fast acting, short stroke valves to maintain pulsed open duration of less then 5.0 ms with zero dribble volume. Dribble volume may slightly reduce performance by reducing the percentage of total propellant decomposed. The chemical decomposition and thermal mass of the liquid propellant and structure will provide an operating temperature of less then 1000° F. The slow reaction rate of the monopropellant combined with the short duration open time for the solenoid control valve will result in over 90% of the monopropellant decomposition, and therefore thrust, occurring during the closed control valve portion of the cycle. Because thrust is developed when the liquid monopropellant is flow controlled, then thrust level will be determined by decomposition rate and nozzle throat diameter instead of liquid propellant flow rate.

In another form of the invention, the catalyst may serve to provide both a catalytic decomposition of the monopropellant and a chemical reaction with decomposition products of the monopropellant. For example, the catalyst may be iridium dissolved in methanol where the catalyst iridium first acts to decompose HAN into the decomposition products, that is, the gas, and methanol reacts with the decomposition products in a chemical reaction to produce the exhaust gas. Hence, HAN and methanol are bipropellants in a catalytic decomposition and chemical reaction propulsion system. In this form of the invention, the iridium catalyst that dissolved in methanol is a liquid that can be injected into the injector manifold using a storage tank and flow control valve, not shown.

The invention is directed to a catalytic transient decomposition propulsion system that uses a flow control valve to control the flow of a decomposition propellant that decomposes in part when the valve is open, and more so when the valve is closed. The flow control valve is open and closed to provide fixed flow of monopropellant into the decomposition chamber. Decomposition rate varies with time over the flow control cycle as the flow controlled liquid monopropellant within the decomposition chamber decomposes from liquid to hot gas and exhausts out of the exhaust nozzle. The catalytic transient decomposition propulsion system can be made small for flexible use with a variety of picosatellites. The catalytically activated transient decomposition propulsion system offers a significantly increased density performance. The system has limitations on the rate at which thrust can be delivered and has a preferred application to small sized satellites. Preferably, HAN is used as the monopropellant as HAN is a non-toxic material, but hazardous material could be used as well. The system increases the delivered impulse achievable from a given system volume of HAN while maintaining safe and easy handling of the monopropellant offering improved propulsion capabilities that will allow greater mission flexibility, including a wider range of usable orbits. While, the HAN propellant, the graduated decomposition chamber, the throat control valve are preferred components, other propellant, chamber design, and thrusting control means can be used. Those skilled in the art can make enhancements, improvements, and modifications to the invention, and these enhancements, improvements, and modifications may nonetheless fall within the spirit and scope of the following claims.

What is claimed is:

1. A catalytic decomposition propulsion system, the system comprising,
   a propellant tank for storing a propellant, the propellant comprising hydroxyl ammonium nitrate, and
   a decomposition chamber for supporting a catalyst for reacting with the propellant for decomposing the propellant into a gas, and
   a control valve positioned between the propellant tank and the decomposition chamber for controlling the passage of the propellant to the decomposition chamber, wherein:
   the control valve has an opened state and a closed state,
   the control valve passes a first amount of propellant in the opened state during a first time period and passes substantially no propellant in the closed state during a second time period,
   the control valve is configured to repeatedly transition between the opened state and the closed state such that a majority of the first amount of the propellant passed through the control valve during the first time period decomposes during the second time period.

2. The system of claim 1 wherein, the control valve is continuously operated between the opened and closed states.

3. The system of claim 1 wherein, the control valve is configured to transition between the opened and closed states such that ninety percent of the first amount of the propellant passed through the control valve during the first time period decomposes during the second time period.

4. The system of claim 1 wherein, a current rate of decomposition of propellant in the decomposition chamber increases after the control valve changes from the opened state to the closed state.

5. The system of claim 1 further comprising, an injector manifold deposed between the decomposition chamber and the flow control valve, the injector manifold having a plurality of injector orifices for distributing the propellant into the decomposition chamber.

6. The system of claim 1 further comprising, a recirculation tube for routing a portion of the gas into the injector manifold for pushing the propellant into the decomposition chamber.

7. The system of claim 1 further comprising, a nozzle for exhausting the gas from the decomposition chamber.

8. The system of claim 1 further comprising,
a nozzle for exhausting the gas from the decomposition chamber, the nozzle having convergent portion, divergent portion and a throat portion, and
a throat valve disposed in the throat portion for controlling the rate of exhaust of the gas from the decomposition chamber.

9. The system of claim 1 further comprising, an injector inlet for passing the propellant from the control valve into the decomposition chamber.

10. The system of claim 1 further comprising, a distribution manifold disposed between the propellant tank and the control valve, and a flow control orifice disposed in the distribution manifold for limiting the flow of the propellant into the decomposition chamber.

11. The system of claim 1 wherein, the propellant is a monopropellant.

12. The system of claim 1, wherein the decomposition chamber comprises a plurality of chamber beds, wherein a first chamber bed selected from the plurality of chamber beds comprises catalyst particles of a first size and a second chamber bed selected from the plurality of chamber beds comprises catalyst particles of a second size, and wherein the first chamber bed is closer to the control valve than the second chamber bed, and wherein the first size is larger than the second size.

13. The system of claim 12, wherein each of the plurality of chamber beds comprises catalyst particles of a different size, and wherein the sizes of the catalyst particles in plurality of chamber beds decreases in the direction of flow from the control valve to a nozzle.

14. A catalytic decomposition propulsion system, the system comprising,
a propellant tank for storing a propellant, the propellant comprising hydroxyl ammonium nitrate,
a decomposition chamber for supporting a catalyst for reacting with the propellant for decomposing the propellant into a gas,
a control valve positioned between the propellant tank and the decomposition chamber for controlling the passage of the propellant to the decomposition chamber, the control valve operating in a opened state and a closed state, the control valve passing a first amount of propellant in the opened state during a first time period and passing substantially no propellant in the closed state during a second time period, and
an injector manifold deposed between the decomposition chamber and the flow control valve, the injector manifold having a plurality of injector orifices for distributing the propellant into the decomposition chamber, and
a nozzle for exhausting the gas from the decomposition chamber, the nozzle having convergent portion, divergent portion and a throat portion, wherein:
the valve is continuously operated between the opened and closed states such that a majority of the first amount of the propellant passed through the control valve during the first time period decomposes during the second time period; and
a current rate of decomposition of propellant in the decomposition chamber increases after the control valve changes from the opened state to the closed state.

15. The system of claim 14 further comprising, a recirculation tube for routing a portion of the gas into the injector manifold for pushing the propellant into the decomposition chamber, a throat valve disposed in the throat portion for controlling the rate of exhaust of the gas from the decomposition chamber.

16. The system of claim 14, wherein the decomposition chamber comprises a plurality of chamber beds, wherein a first chamber bed selected from the plurality of chamber beds comprises catalyst particles of a first size and a second chamber bed selected from the plurality of chamber beds comprises catalyst particles of a second size, wherein the first chamber bed is closer to the control valve than the second chamber bed, and wherein the first size is larger than the second size.

17. The system of claim 16, wherein each of the plurality of chamber beds comprises catalyst particles of a different size, and wherein the sizes of the catalyst particles in plurality of chamber beds decreases in the direction of flow from the control valve to a nozzle.

* * * * *